(12) United States Patent
Cheung

(10) Patent No.: US 9,520,825 B2
(45) Date of Patent: Dec. 13, 2016

(54) PORTABLE SOLAR PANEL TRACKING DEVICE

(71) Applicant: Lob Cheung, Richmond, CA (US)

(72) Inventor: Lob Cheung, Richmond, CA (US)

( * ) Notice: Subject to any disclaimer, the term of this patent is extended or adjusted under 35 U.S.C. 154(b) by 0 days.

(21) Appl. No.: 14/795,178

(22) Filed: Jul. 9, 2015

(65) Prior Publication Data

US 2016/0020727 A1 Jan. 21, 2016

Related U.S. Application Data

(60) Provisional application No. 62/023,249, filed on Jul. 11, 2014.

(51) Int. Cl.
| | |
|---|---|
| *H02S 10/40* | (2014.01) |
| *H02S 20/30* | (2014.01) |
| *H02S 20/10* | (2014.01) |
| *H02S 30/20* | (2014.01) |
| *H02S 30/10* | (2014.01) |

(52) U.S. Cl.
CPC .............. *H02S 10/40* (2014.12); *H02S 20/30* (2014.12); *H02S 20/32* (2014.12)

(58) Field of Classification Search
CPC .................................. H02S 30/20; H02S 10/40
See application file for complete search history.

(56) References Cited

U.S. PATENT DOCUMENTS

| 6,201,181 | B1 | 3/2001 | Azzam et al. | |
|---|---|---|---|---|
| 7,793,654 | B1 | 9/2010 | Thorne | |
| 7,884,308 | B1 | 2/2011 | Mejia | |
| 7,898,212 | B2 | 3/2011 | Benn et al. | |
| 8,161,962 | B2 | 4/2012 | Kuo | |
| 8,487,180 | B1 * | 7/2013 | Fraas | F24J 2/4638 136/243 |
| 2007/0297058 | A1 * | 12/2007 | Briee | E04D 13/033 359/597 |
| 2009/0165841 | A1 * | 7/2009 | Gunn, Jr. | F24J 2/38 136/245 |
| 2014/0014159 | A1 * | 1/2014 | Polk | H01L 31/0522 136/246 |

* cited by examiner

*Primary Examiner* — Susan D Leong
(74) *Attorney, Agent, or Firm* — Harpman & Harpman

(57) ABSTRACT

A portable self-contained solar energy generation platform for tracking a source of solar energy and automatically maintaining optimum solar collection panel positioning for maximum energy output during operation. The solar tracking platform comprises a folding solar panel support stand on a power turntable with a solar tracker control actuation device in communication therewith.

6 Claims, 7 Drawing Sheets

PORTABLE SOLAR PANEL TRACKING DEVICE

This application claims the benefit of U.S. Provisional Application No. 62/023,249, filed Jul. 11, 2014.

BACKGROUND OF THE INVENTION

1. Technical Field

This invention relates to solar collection and electrical power generation of solar panels that track the sun.

2. Description of Prior Art

Prior art devices of this type have been directed to sun tracking and solar collecting systems to support photovoltaic solar cells for the conversion of solar energy into electrical power. Examples of such can be seen in U.S. Pat. Nos. 6,201,181, 7,793,654, 7,884,308, 7,898,212 and 8,161,962.

U.S. Pat. No. 6,201,181 discloses a portable solar modular cart having a wheeled platform with a solar panel frame adjustably positioned therefrom.

U.S. Pat. No. 7,793,654 claims a solar panel positioning apparatus that has a solar panel support for vertical axis rotation as to positioning adjustability for changes in the angular position relative to an engagement base.

U.S. Pat. No. 7,884,308 is directed to a solar power sun tracker that tracks the sun and maintains a solar panel in optimum position relative to the sun. The tracker uses multiple power modules to rotate the panel on dual axis in response to solar source positioning.

U.S. Pat. No. 7,898,212 illustrates a portable solar generator having at least one solar panel on a rotating support frame extending from a wheeled enabled cart with a rechargeable battery contained thereon.

Finally, in U.S. Pat. No. 8,161,962, a sun tracking system is disclosed having a solar panel support frame with multiple pairs of actuation support cylinders, each with a servo motor drive. By activating the cylinders in opposing sequence, the attached solar panel can be moved to maintain alignment with the sun.

SUMMARY OF THE INVENTION

A portable solar panel support and tracking device that can be collapsed and easily moved from one location to the next. The solar panel tracker has an upstanding hinged panel support frame mounted on a rotary base within an integrated electrical tracking solar controller that will activate a drive motor on the base to maintain the solar panels optimum position relative to the sun. The solar panels are removably mounted on the angular support frame and allow for ease of assembly, and therefore portability.

DESCRIPTION OF THE PREFERRED EMBODIMENT

Figure 1:
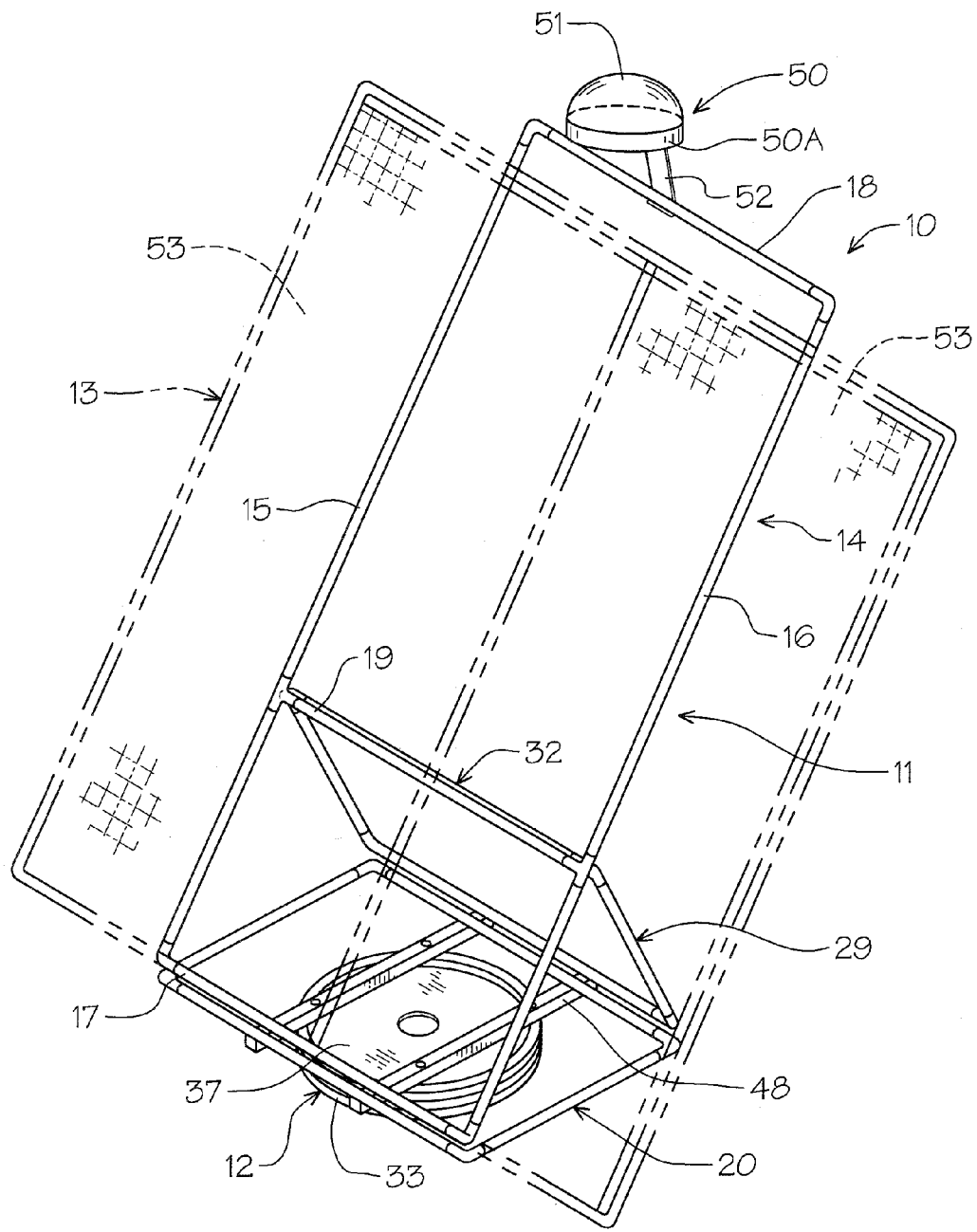
FIG. 1 is a perspective view of the portable solar panel tracking device in opened used position with portions shown in broken lines.
Figure 2:
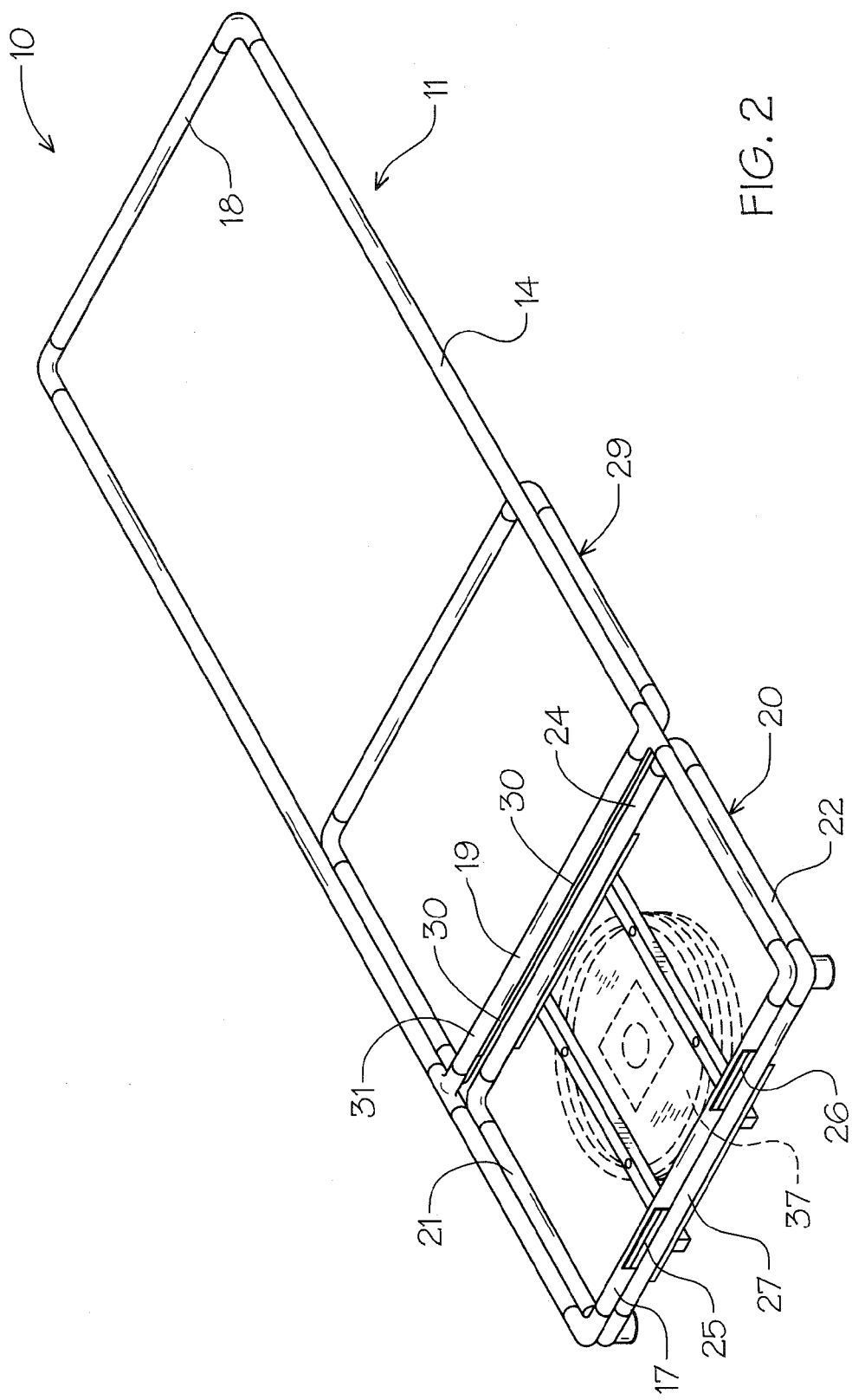
FIG. 2 is a perspective view of the portable solar panel tracking device frame in collapsed transport position with solar panels removed.

Referring to FIGS. 1 and 2 of the drawings, a portable solar panel tracking device 10 of the invention can be seen having a main support frame assembly 11, a powered turntable assembly 12, and multiple photovoltaic cells (solar panels) 13. The main support frame 11 has an upstanding panel support frame 14 with a pair of longitudinally extending space parallel members 15 and 16, and oppositely disposed interconnecting end members 17 and 18, defining a rectangular support. A cross support member 19 extends transversally between the parallel members 15 and 16 in space relation to the end member 17.

The panel support frame 14 is hinged to a base frame assembly 20 having space parallel tubular side members 21 and 22 with interconnecting opposing end members 23 and 24 and is of a transverse dimension equal to that of said main support frame 11.

Figure 7:
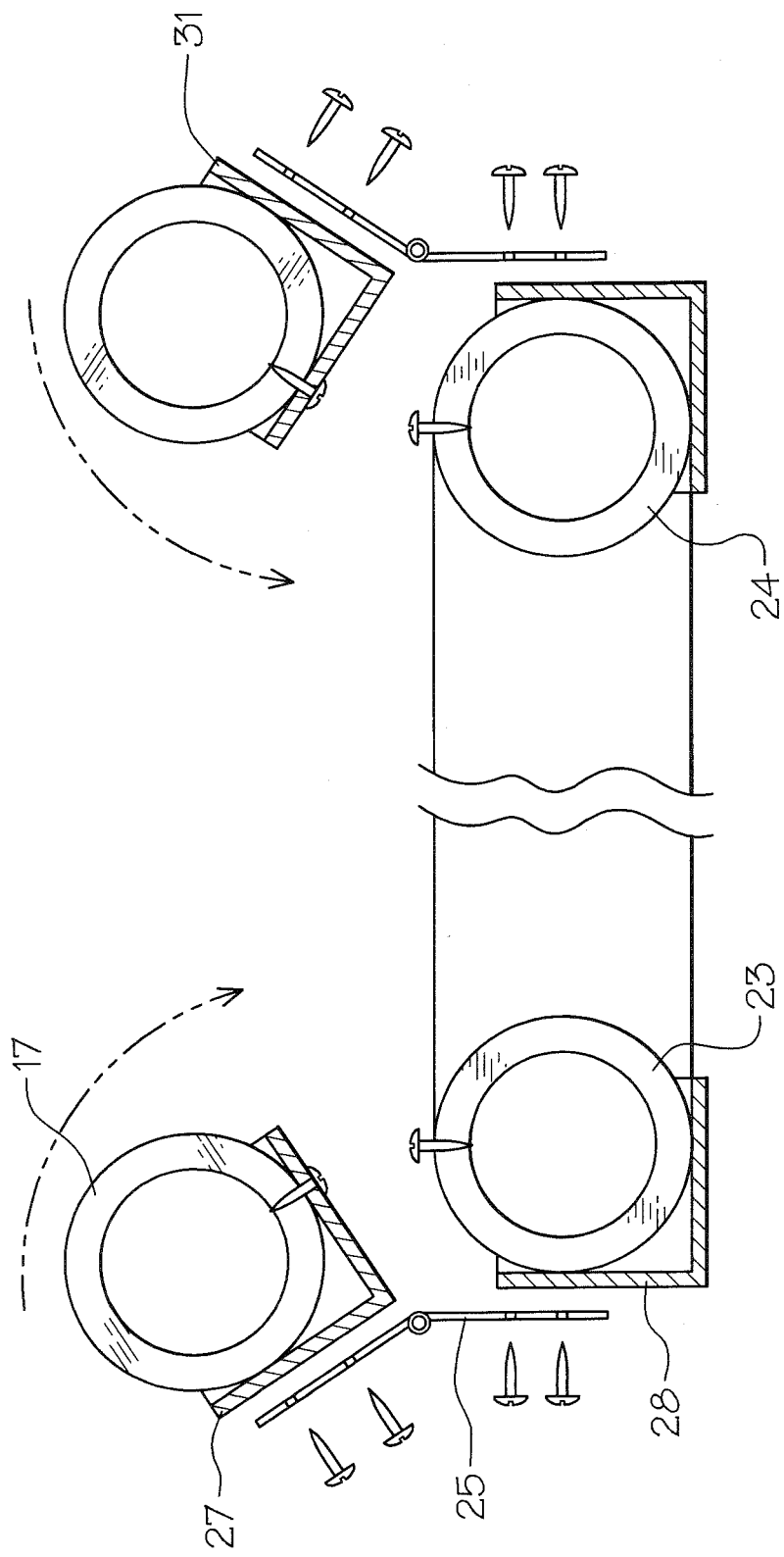
FIG. 7 is an enlarged partial sectional view of the hinged support mounts on the frame.
Figure 8:
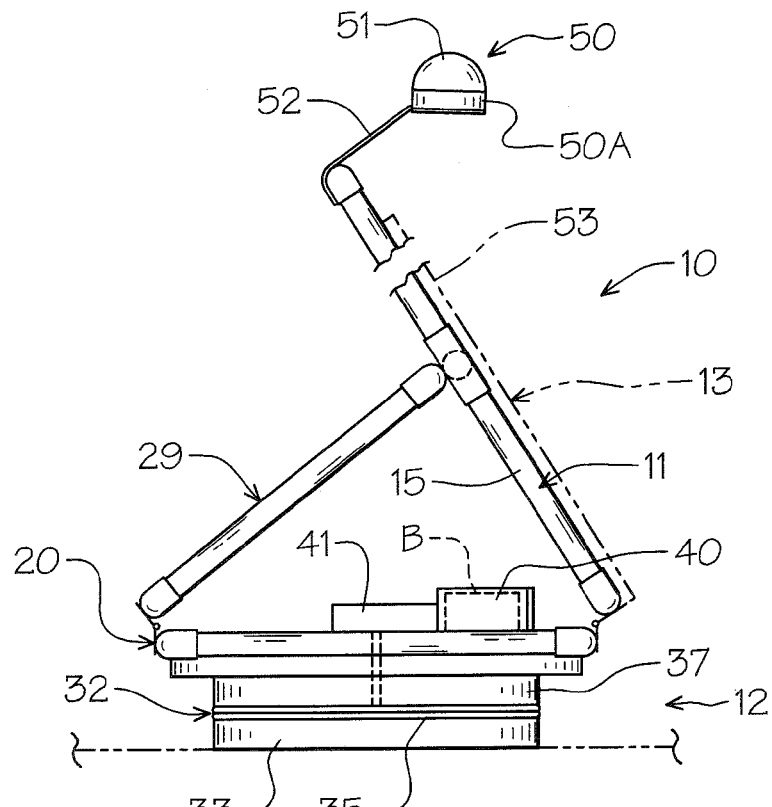
FIG. 8 is a side elevational view of the solar tracking device assembled and deployed with portions broken away.

The base frame assembly 20 is hinged along its respective end member 23 to the correspondingly aligned end member 17 of the main support frame 11 by hinge pairs 25 and 26 secured to respective metal mounting angles 27 and 28 secured on the respective tubular members as best seen in FIGS. 2,7 and 8 of the drawings.

A retainment frame 29 having the same dimensions and structural configurations as that of the hereinbefore described base frame 20 is hinged thereto along the corresponding parallel aligned end member 24 by multiple hinge elements 30 on respective mounting angles 31 attached thereto, as illustrated in detail in FIG. 7 of the drawings. The hinged multiple frame elements 20, 29 and 14 can therefore be folded flat as seen in FIG. 2 of the drawings for transport, and then configured to form the annular upstanding main frame assembly 11 as seen in FIGS. 1 and 8 of the drawings.

Figure 9:
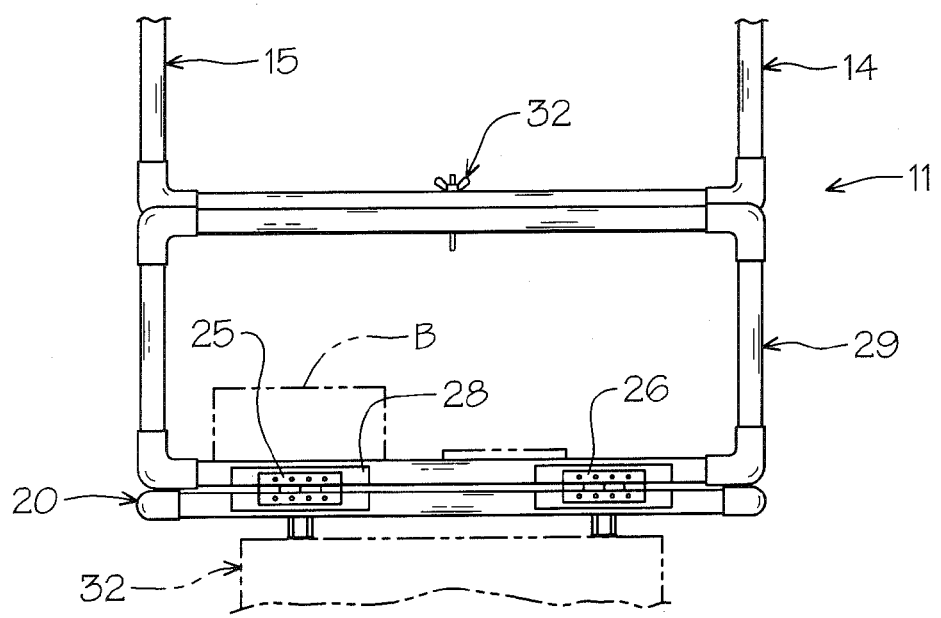
FIG. 9 is front elevational view of the solar tracking device with portions broken away and shown in broken lines.

A threaded retaining fitting 32 (nut and bolt) selectively interlock the panel support frame 14 to the retainment frame 29 when so deployed, as seen in FIGS. 1,8 and 9 of the drawings.

Figure 3:
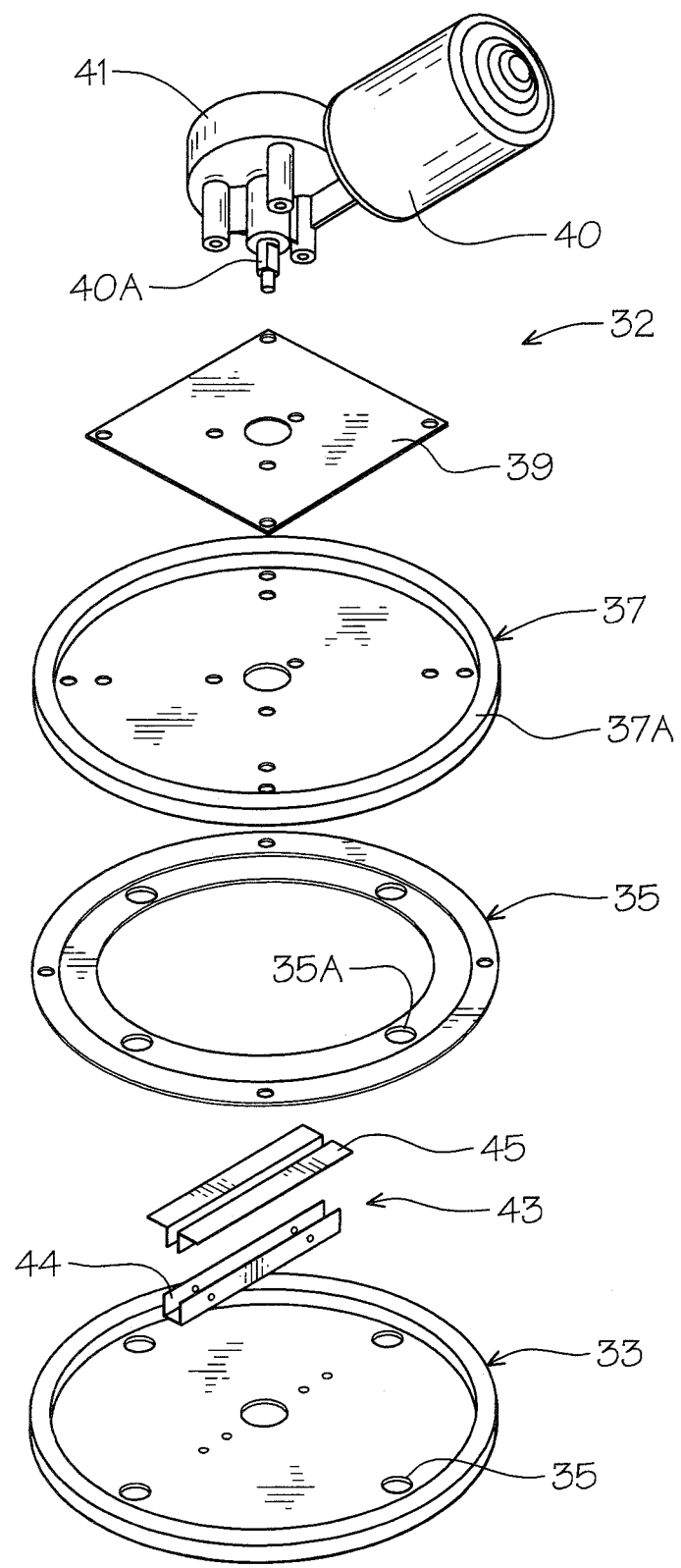
FIG. 3 is an enlarged partial exploded perspective view of the power rotating turntable frame and support base.
Figure 4:
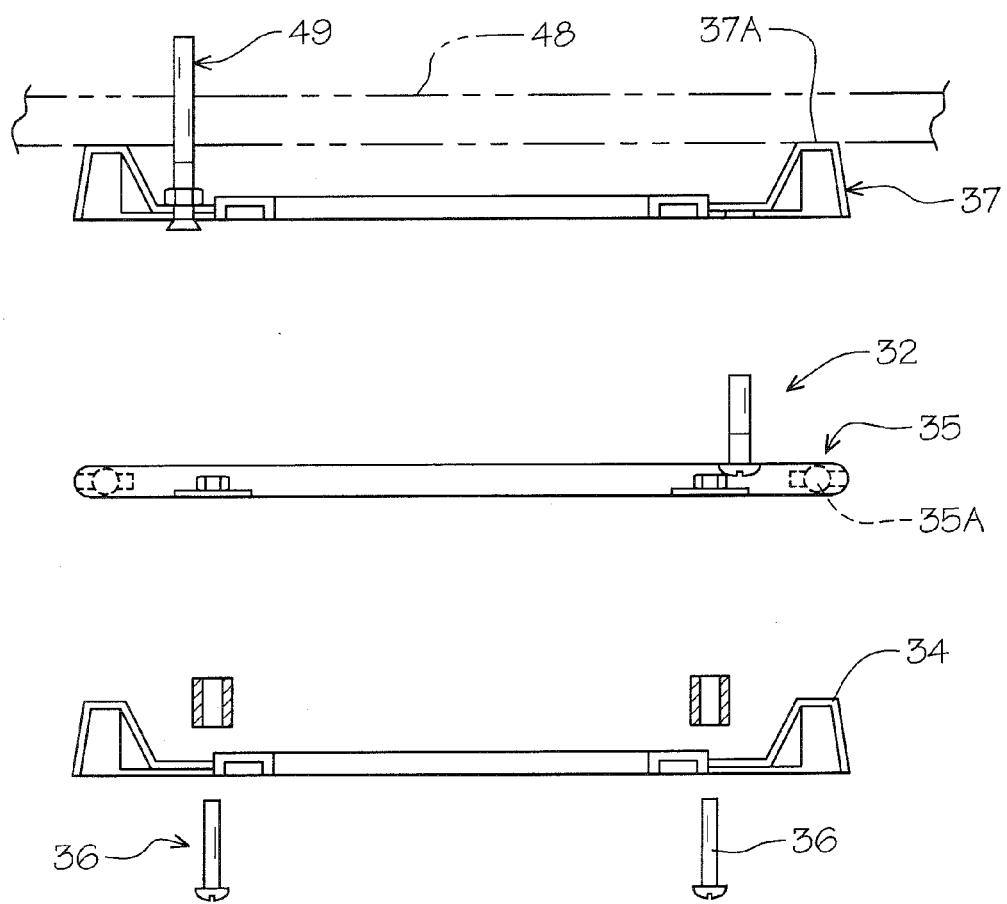
FIG. 4 is an exploded view of the turntable assembly with portions shown in broken lines.

Referring now to a power turntable base assembly 32 best seen in FIGS. 3,4 and 8 of the drawings, is used to rotate the upstanding frame assembly 11 has a stationary centrally apertured angular base member 33 with an upstanding perimeter lip 34 and multiple assembly access apertures 35 therethrough. A "Lazy Susan" type bearing ring kit 35 can be seen with multiple bearings 35A secured to the base member 33 by multiple fasteners 36 which are comprised of threaded bolt, spacers and lock nut washer configurations, as seen in assembly shown in FIG. 4 of the drawings.

An apertured top plate 37 with an annular upstanding lip 37A is mounted to the bearing kit 35 by multiple flat fasteners 38. A motor mount plate 39 is correspondingly secured to the top plate 37 to which a D.C. drive motor 40 with interconnected gear transfer drive shaft assembly 41 as will be described in greater detail hereinafter.

Figure 5:
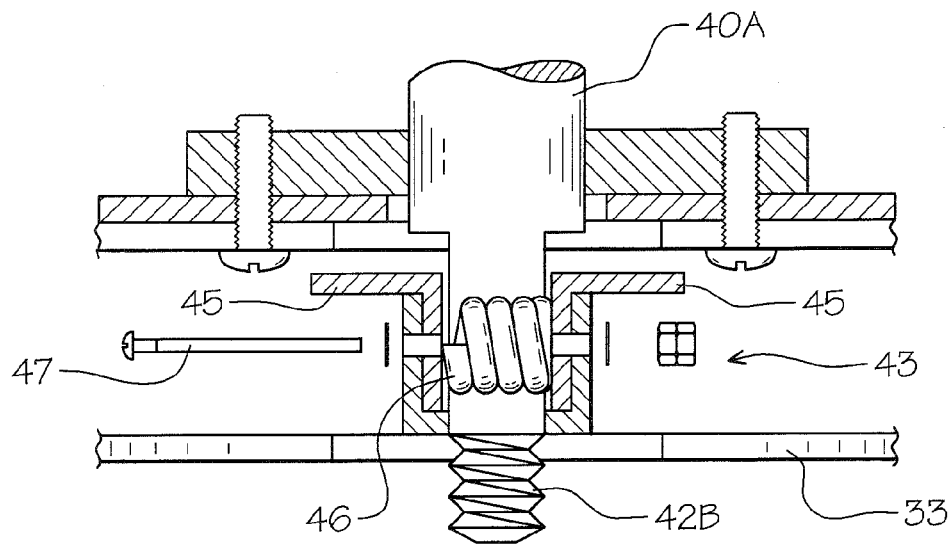
FIG. 5 is an enlarged partial sectional view of the drive motor attachment assembly to the turntable.
Figure 6:
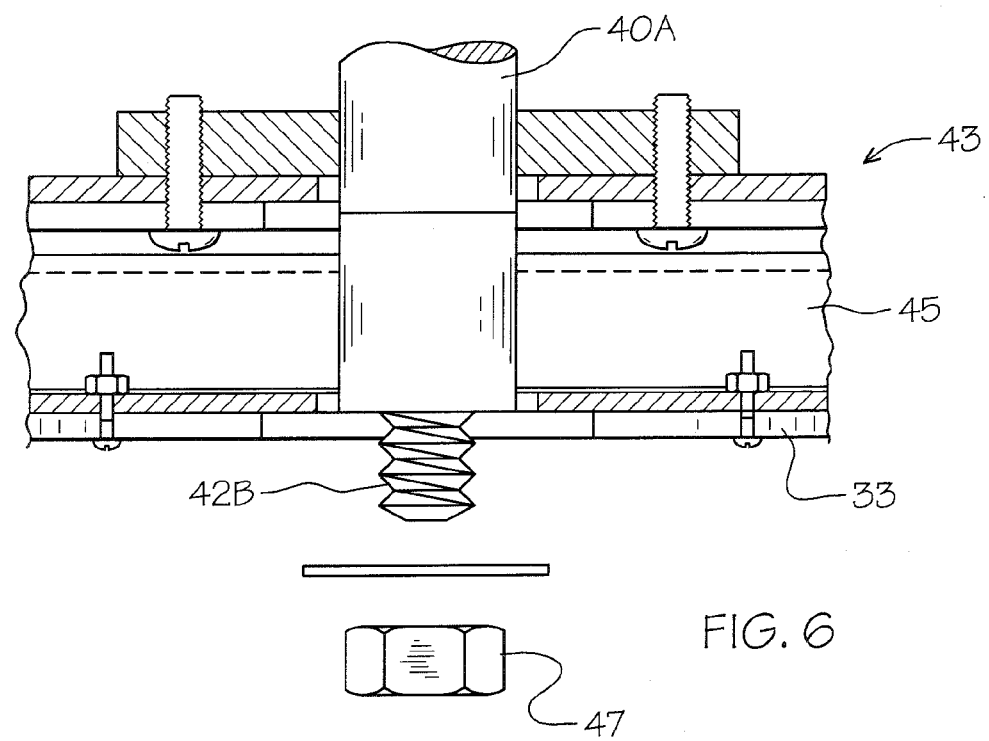
FIG. 6 is an enlarged partial sectional view on lines 6-6 of FIG. 5.

The D.C. drive motor 40 and interconnected gear transfer drive shaft assembly 41 are secured to the mounting plate 39 on the top plate 37 with a drive shaft 40A extending from the gear transfer drive through the aligned apertures of the turntable base assembly 32 down to a shaft engagement channel assembly 43 best seen in FIGS. 5 and 6 of the drawings.

The channel engagement assembly 43 has an upstanding C-channel 44 secured to the turntable annular base 33 with a pair of angle bars 45 positioned therewithin. Correspondingly, a pair of longitudinally spaced retainer springs 46 are positioned between the angle bars 45 by respective fasteners 47, applying spring tension thereto.

It will be seen that the drive shaft 42 has flattened opposing registration surfaces 42A inwardly of a threaded end portion 42B that extends into and through the C channel engagement assembly 43 with a retainment end shaft nut 47 thereon, securing same as will be understood by those skilled in the art.

Referring now to FIGS. 1,2,8 and 9 of the drawings, a pair of square tubular mounting members 48 can be seen secured across the bottom of the base frame assembly 20 to the respective frame metal angles 27 and 31 as hereinbefore described.

Accordingly, the turntable base assembly 32 is secured to the mounting members 48 by multiple machine screw and hex nut washer fastener combinations 49, as best seen FIG. 4 of the drawings, completing the main support frame assembly and power turntable assembly 12 as seen in FIGS. 1 and 8 of the drawings.

An electronic solar tracker 50 comprising a housing 50A with a clear enclosure dome 51 has an electrical solar activation and positioning controller circuit well-known and commercially available with in the art, that provides real time tracking of a source of solar energy and associated motor drive activation in response thereto.

The solar tracker 49 is in this example, secured to the frame member 11 by a mounting bracket 52 and is in communication with a source of power (battery) B and any associated required circuits to intercommunicate with the power turntable assembly and activate same, as described above.

A photovoltaic (solar) panel array 53 illustrated in broken lines in FIGS. 1 and 8 of the drawings, is removably mounted on the upstanding panel support frame 14 by a series of appropriate retainment fixation fasteners required for such an application, as will be evident to those skilled within the art. The solar panel array 53 in this example is hinged along its center line CL so the pair of photovoltaic panels may be folded after being removed for transport or storage.

It will thus be apparent from the above description that in operation the portable self-contained solar energy generating platform will provide by activation of its D.C. drive motor 40 the corresponding drive shaft 41 and the attached base frame assembly 20 will rotate in response to the solar source position, thus maintaining the solar panel array in optimum alignment with the sun during use for maximum power generation.

It will thus be seen that a new and novel portable self-contained solar energy generating platform for tracking a source of solar energy and automatically maintaining optimum solar collection panel positioning for maximum energy output during operation has been illustrated and described, and it will be apparent to those skilled in the art that various changes and modifications may be made therein without departing from the spirit of the invention.

Therefore I claim:

1. A portable self-contained solar panel array comprising in combination,
   a powered turntable having a ground engaging base and an oppositely disposed rotatable surface,
   a base support frame secured to said rotatable surface of said powered turntable,
   an electric motor on said rotatable surface interconnected to said base support frame,
   a solar panel support frame hinge to said support frame,
   a retainment frame hinged to said support frame in oppositely disposed relation to said solar panel support frame for selective engagement with said solar panel support frame,
   said solar panel support frame and said retainment frame movable from a first folded flat position to a second upright engagement position with one another,
   said solar support frame and said retainment frame are rectangular tubular construction of equal transverse dimension and unequal longitudinal length,
   a hinged photovoltaic panel array including multiple solar cells removably secured to said solar panel main support frame,
   an electronic solar tracker controller in electrical communication with said motor and said photovoltaic panel array.

2. The portable self-contained solar panel array set forth in claim 1 wherein said tubular base further comprises, a ground engaging stationary base member, a bearing ring on said base member, said base rotatable surface secured to said bearing ring.

3. The portable self-contained solar panel array set forth in claim 1 wherein said solar tracking controller comprises,
   a housing,
   a transparent dome on said housing,
   an activation and solar positioning control circuit in electrical communication with said base member.

4. The portable self-contained solar panel array set forth in claim 1 wherein said solar tracker controller is removably positioned to a portion of said hinged solar panel support frame and is programmed to analyze readings from a light sensor and control said electric motor to align said solar panel support frame and said solar panel thereon with the sun for maximum output.

5. The portable self-contained solar panel array set forth in claim 1 wherein said electric motor further comprises,
   interconnected gear reduction and a transfer drive shaft assembly registerable and in communication with said stationary ground engaging base.

6. The portable self-contained solar panel array set forth in claim 1 wherein said solar tracker has an independent source of power.

* * * * *